(12) United States Patent
Li

(10) Patent No.: US 6,513,024 B1
(45) Date of Patent: Jan. 28, 2003

(54) SELF-OPTIMIZATION WITH INTERACTIONS

(76) Inventor: Chou H. Li, 8001 Sailboat Key Blvd. #404, Souoth Pasadena, FL (US) 33707

( * ) Notice: Subject to any disclaimer, the term of this patent is extended or adjusted under 35 U.S.C. 154(b) by 0 days.

(21) Appl. No.: 09/268,297

(22) Filed: Mar. 16, 1999

(51) Int. Cl.[7] .................................................. G06N 5/02
(52) U.S. Cl. ............................ 706/45; 706/13; 706/25
(58) Field of Search ............................. 706/45, 13, 25

(56) References Cited

U.S. PATENT DOCUMENTS

| | | | |
|---|---|---|---|
| 3,460,096 A | 8/1969 | Barron | |
| 3,460,296 A | 8/1969 | Barron | |
| 3,466,430 A | 9/1969 | Hardaway | |
| 3,519,998 A | 7/1970 | Barron | |
| 3,576,976 A | 5/1971 | Russo | |
| 3,601,811 A | 8/1971 | Yoshino | |
| 3,694,636 A | 9/1972 | Smith | |
| 3,705,409 A | 12/1972 | Brayton et al. | |
| 3,794,271 A | 2/1974 | Barron et al. | |
| 4,368,509 A | 1/1983 | Li | |
| 4,472,770 A | 9/1984 | Li | |
| 4,495,559 A | 1/1985 | Gelatt, Jr. et al. | |
| 4,517,468 A | 5/1985 | Kemper et al. | |
| 4,525,775 A | 6/1985 | Eydelman | |
| 4,649,515 A | 3/1987 | Thompson | |
| 4,658,370 A | 4/1987 | Erman et al. | |
| 4,697,242 A | 9/1987 | Holland et al. | |
| 4,710,864 A | 12/1987 | Li | |
| 4,829,450 A | 5/1989 | Manthey | |
| 4,910,660 A | 3/1990 | Li | |
| 4,935,877 A | 6/1990 | Koza | |
| 5,079,690 A | 1/1992 | Li | |
| 5,136,686 A | 8/1992 | Koza | |
| 5,140,530 A | * 8/1992 | Guha et al. | 706/13 |
| 5,148,513 A | 9/1992 | Koza et al. | |
| 5,263,120 A | 11/1993 | Bickel | |
| 5,410,634 A | 4/1995 | Li | |
| 5,598,510 A | * 1/1997 | Castelaz | 706/25 |
| 5,946,673 A | * 8/1999 | Fracone et al. | 706/13 |

OTHER PUBLICATIONS

Huang, R.; Fogarty, T.C., Adaptive classification and control–rule optimisation via a learning algorithm for controlling a dynamic system, Decision and Control, 1991., Proceedings of the 30th IEEE Conference on, Dec. 11–13, 1991, pp.: 867–868 vol. 1.*

Akbarzadeh–T., M.–R.; Kumbla, K.K.; Jamshidi, M., Genetic algorithms in learning fuzzy hierarchical control of distributed parameter systems, Systems, Man and Cybernetics, 1995. Intelligent Systems for the 21st Century., IEEE International Conference on.*

Topalov, A.V.; Kwang–Choon Kim; Jong–Hwan Kim; Bong–Kuk Lee, Fast genetic on–line learning algorithm for neural network and its application to temperature control, Evolutionary Computation, 1996., Proceedings of IEEE International Conference on, May 20–22.*

(List continued on next page.)

Primary Examiner—Wilbert L. Starks, Jr.
(74) Attorney, Agent, or Firm—Hall, Priddy & Myers; Matthew A. Pequignot

(57) ABSTRACT

A method for computer-generating interaction-specific knowledge base for rapidly improving or optimizing a performance of an object comprises performing, according to computer-designed test matrices, at least several automatic experimental cycles on selected control variables. In at least one of the automatic experimental cycles after the first the computer plans a new test matrix designed to minimize or remove at least one expected two-variable interaction from a main effect of a designated control variable. A machine operating according to the method is also available.

34 Claims, 3 Drawing Sheets

OTHER PUBLICATIONS

Su et al., "KBMS Based Evolutionary Prototyping of Sotfware Systems", IEEEm p. 80–90 (1997).

Oleary et al., "Artificial Intelligence and Virtual Organization", Comm. of the ACM, vol 40, No. 1, p. 52–59 (1997).

Atolagbe et al., "A Generic Architecture for Intelligent Instrcution for Simulation Modeling Softwatre Package", Winter Simulation Conference., p. 856–863 (1996).

Matthews et al., "Improving the performance of Log Structured File Systems with Adaptive Methods", SOSP ACM, p. 238.251 (1997).

Benyan et al., "Developing Adaptive Systems to fit Individual Aptitudes", Intelligent user Interface, ACM, p. 115–121 (1992).

J.J. Grefenstette, GeneticAlgorithms & Their Application.

C.H. Li, Worksheet Gives Optimum Conditions.

C.H. Li Sequential Screening Method.

D.L. Heiserman, "How to Build Your Own Self Programming Robot", Tab Books: Blue Ridge Summit, PA (1979), pp. 202–205.

Ch. L:. "Worksheet Gives Optimum Conditions", Chemical Engineering, McGraw–Hill : New York (Apr. 7, 1958).

C.H. Li, "A Sequential Method for Screening Experimental Variables", AM. Statistical Ass. Journal, vol. 57 (Jun. 1962), pp. 455–477.

Munson et al., "Optimization by Random Search on the Analog Computer", Nat. Simulation Conf, Dallas, Tx (Oct. 25, 1958).

J.O. Ramsay, "A Family of Gradient Methods of Optimization", The Computer Journal, vol. 13, No. (Nov. 1970), pp. 413–417.

R.F. Service, "Training Lasers to be Chemists", Science, vol. 279 (Mar. 20, 1998), pp. 1847–1848.

"Process Integration Remains Key to Semiconductor Wager Profits", R&D Magazine (Jun. 1994), pp. 18–20.

"Wave Rider Product Information", Biofeedback Instruments Co., 255 W. 98$^{th}$ St. NY, NY 10025.

* cited by examiner

SELF-OPTIMIZATION WITH INTERACTIONS

BACKGROUND OF THE INVENTION

1. Field

The invention relates to self-optimizing method and machine; and more particularly to multivariable, real-time self-optimizing method and machine to determine, with highly fractionally replicated experiments, substantially true main effects of control variables little contaminated by interactions.

2. Prior Art

Computer-controlled, automation systems are widely used. All these systems are extremely powerful. With their uses, consistency is generally achieved together with usually, but not always, associated improved profits, productivity, and product or service qualities ($P^3Q$).

Further, by transferring to machines human intelligence, rather than skill, these systems have ushered us into this Second Industrial Revolution.

But human intelligence or knowledge bases merely document averaged previous test results on old samples with equipment, materials, parts, procedures, or environment different from the present or future. Inherent are errors due to the various samplings, assumptions, or extrapolations, and repeated human interactions. These knowledge bases are often incomplete, inaccurate, biased, erroneous, out-of-date, and too generalized for use in a particular automation task with a specific combination of equipment, procedures, materials, parts, and environment.

Detailed knowledge bases on modern technologies are particularly lacking. Even many old yet important technologies are not fully understood. Each of these technologies involves many processing steps often with unknown chemical, mechanical, electromagnetic, aerodynamic, fluidic, or other phenomena on the subatomic, atomic, microscopic, macroscopic, or other levels. Even the controlling variables in each phenomenon are often not known, and certainly have not been thoroughly studied. In fact, much research and development (R&D) remains to be done in every field. Yet time is running out in this highly competitive world. A new R&D method must, therefore, be developed.

For example, system dynamics of modern processes and equipment are generally ill-defined. Chemical and metallurgical reactions are often uncertain. The mechanism of catalysis is not completely known. Crystal growth is still an art. After millions of controlled welding experiments, the critical welding variables cannot yet be even identified among the very many possible. In the case of the new high-temperature ceramic superconductors, the samples often are still hard to make, shape, purify, reproduce, isolate, stabilize, confirm, or even determine compositions.

Without reliable knowledge bases, the usual automation specialists would be at a loss in selecting the few among many manufacturing or servicing phenomena or variables to be controlled, in formulating the system dynamics models, in setting up the control equations, in determining the control constants, and in specifying setpoints for the control variables.

The fragile and unreliable knowledge bases often give only partial or invalid system dynamics models, oversimplified control equations, and inexact or misleading control constants. In addition, all the setpoints are too arbitrary and round-numbered (e.g., 800° C. and not 796.768° C., 3 feet per minute, 20 gallons) to be possibly optimal statistically. The chance of these variables or setpoints being optimal at any time, not to say instantaneously or continuously, is nearly zero. Further, the optimal setpoints cannot, by definition, be constant, as is assumed in present automation systems, but must change with variations in time, equipment, procedures, materials, parts, and environment.

The conventional automation systems are also not smart and must be spoon-fed at every step via computer programs or master-slave instructions. They are not totally integrated or automated, and require constant human guidance, interaction, supervision review, and analysis.

The repeated human involvement greatly slows down the conventional automation systems, and passes to machines many defects of the inconsistent and imperfect human test planners, samplers, testers, data collectors and analyzers, communicators, and technicians. Humans are million or billion times slower and less reliable than microprocessors at least in, e.g., memory recalling or storing, information inputting or outputting, data analyzing, communicating, and commanding or actuating.

In addition, usually these present systems merely passively adapt, adjust, correct, control, or regulate, in response to variations in the environment or a few control variables. Dealing with more than several interacting variables results in extremely large number of tests to be made; and in massive amount of data to be collected, conditioned, stored, and quickly or instantly analyzed. This is often impossible because of the well-known problems of "combinatorial explosion" and "computer intractability," as shown below.

Yet, modern technologies invariably involve many unpredictable, interacting, and rapidly changing control variables in such categories as: raw materials, vendors, batches, lots, and conditions; compositioning; processing equipment; procedures in each of the many steps in every process; and environment. Many phenomena are transient but highly nonreproducible yet unknown and critical.

Artificial intelligence (AI) technologies, particularly the expert systems, have been developed and increasingly used in various fields. But again the knowledge bases are often inadequate or deficient, particularly on developing technologies. The present expert systems are also costly, inflexible, qualitative, and often inaccurate and out-of-date particularly for complicated yet rapidly improving modern technologies. In addition, they too cannot handle the inherently large number of interacting variables.

Reliable and relevant knowledge base (KB) is scarce and very costly. Up to now, the main bottleneck in the development of expert systems has been the acquiring of the knowledge base in computer-usable form. Human knowledge often not only is fragile, costly, unreliable, but difficult to be translated for uses by machines. Even not in real time, codifying an expert's limited knowledge has always been a very long and labor-intensive process, if at all possible.

Hence, experts conclude that machine learning is the key to the future of automation in general and expert systems in particular. The machine must first learn through computerized experimentation involving at least 7 (as in steel-making example shown later), 60 (as in a software development shown later), 127 (as in a later case to estimate the computing time), or several hundred and several thousand (as in screening for drugs or chemicals) variables.

The comprehensive but instantly produced knowledge base, not just a few isolated numbers, must be generated in bulk and at low cost. For best results, the new knowledge base must also be computer-coded in real time into, e.g., expert rules for instant use by another machine. The other machine must also select the most relevant knowledge from the comprehensive results, digest and learn from, e.g., the expert rules, and make logical decisions as to which rules or conditions to apply, for the proper and most efficient uses of the knowledge base. This is totally different from merely "telecommunicating" a few isolated optimum values disclosed in Li's U.S. Pat. No. 4,472,770 patent. The Li' self-optimizing method is much more than simple telegraphing words or numbers invented many years ago. So far, however, no such machines exist.

Conventional AI development environments have difficulties in producing efficient real-time systems. This is partly due to the fact that the same code necessary to enhance the development environment slows down the system run-time. To overcome this limitation, AI system designers must embed the knowledge base (KB) into their own custom run-time AI shells to achieve real-time performance. Unfortunately, the deeper the KB is embedded into the actual code, the harder it is to change the KB when maintenance is necessary. The AI system designer must constantly balance system performance versus ease of maintaining and manipulating the KB. An automation system with real-time KB generating capacity is highly desirable.

Present automation systems also invariably contain various hidden errors of samplings, assumptions, extrapolations, scaling-ups, and statistical fluctuations of uncertain magnitudes. These systems have other errors due to, e.g., misused or miscalibrated sensors, imperfect actuators, drifting equipment, and partially damaged components. These errors damage the consistency and uniformity in, e.g., manufacturing or servicing results.

Li in his prior patents on self-optimizing method and machine, e.g., U.S. Pat. Nos. 5,079,690, 4,910,660 4,710, 864, 4,472,770, and 4,368,509, presents computerized, automatic research and development (R&D) methods and machines to self-optimize, e.g., for automatically generating new comprehensive knowledge bases on complicated, modern technologies. These patented techniques overcome the common problems of combinatorial explosion and computer intractibility through efficient statistical experimental designs. To handle very large number of control variables always present in modern technologies, the computer-planned test matrices use highly fractionally replicated statistical designs.

These designs test m variables on n tests, in which n may be only m+1. For example, a maximum of m=7 variables at two test levels each may be studied with only $n=m+1=8=2^3$, instead of the usual $2^7=128$ tests. This design is, therefore, a $\frac{1}{2}^{7-3}=\frac{1}{2}^4=\frac{1}{16}$th. replicated design. In this case, there are m main effects for the m variables, and one overall average for reference so that m+1=n.

In Li's prior self-optimizing technology, repeated self-optimizing cycles always use the same test matrix, designed to run always around the previous optimal variable combination. Hence, the main effects of the control variables are always contaminated by the interactions, because the experiments are fractionally replicated. Each main effect shows the effect of a single control variable, on the performance of the object. Each interaction effect gives the combined effects of a plurality of control variables, of the same performance of the object. Further, starting a repeated self-optimizing experimental centered around the previous optimum variable combination narrows down the search to only local optimum values. The desired global optimum point, often much better than the local optimum points, may never be reached no matter how many times the self-optimizing cycles are repeated.

Accordingly, an object of the present invention is to deal with not only the main effects of the control variables, but also the interaction effects of two or more control variables;

Another object of the invention is to separate the main effect of the control variables from selected combined interaction effects of multiple variables;

A yet another object of the invention is to determine the true main effect of selected control variables, uncontaminated by interaction effects of multiple variables in combination;

Yet another object of the invention is to search for the global optimal point, rather than a local optimum point;

A further object of the invention is to provide real-time self-optimizing machine and method capable of handling tens, hundreds, thousands, or more variables with minimum human guidance;

Another object of this invention is to provide close-looped, self-optimizing machine or method which can optimize practically continuously and instantly;

A broad object of the invention is to provide self-optimizing machine or method based on totally self-planned and controlled tests, performed on the very particular machine or method itself without relying on many assumptions, invalid scaling-up laws, and extrapolation from sampled test results obtained on other similar machines or methods; and with practically instant data analyses for timely optimization results;

Yet another object of the invention is to self-optimize in practical or nonideal conditions by tolerating, neutralizing, or suppressing the effect of errors due to defective knowledge bases, miscalibrated sensors, imperfect actuators, drifting equipment, damaged components, and statistical fluctuations;

A further object of the invention is to provide self-optimizing machine or method which operates with deficient and minimal or practically zero knowledge bases, rapidly generates its own new knowledge bases through automatic R&D, and immediately and continuously replaces these new knowledge bases with still newer and more accurate knowledge bases for continuously optimal results;

An additional object of the invention is to provide self-optimizing machine and method which actively computes, and automatically sets at, the instantaneous optimal combinations of the many relevant variables in various categories, with instant feed-back to supply data for immediate replanning, retesting, and reoptimiizng, all without human intervention;

Another object of the invention is to manufacture, in bulk, reliable knowledge bases for the instant development of relevant expert rules or systems for inference engines.

Further objects and advantages of my invention will appear as the specification proceeds.

SUMMARY OF THE INVENTION

A method for computer-generating interaction-specific knowledge base for rapidly improving or optimizing a performance of an object comprises performing, according to computer-designed test matrices, at least several computerized automatic R&D cycles on selected control variables. In at least one of the automatic R&D cycles after the first the computer plans a new test matrix designed to minimize or remove at least one expected two-variable interaction effect from a main effect of a single control variable. A machine operating according to the method is also available.

DESCRIPTION OF THE DRAWINGS

The invention and its further objects and features will be more clearly understood from the following including the drawings in which.

DESCRIPTION OF THE PREFERRED EMBODIMENTS

Figure 1:
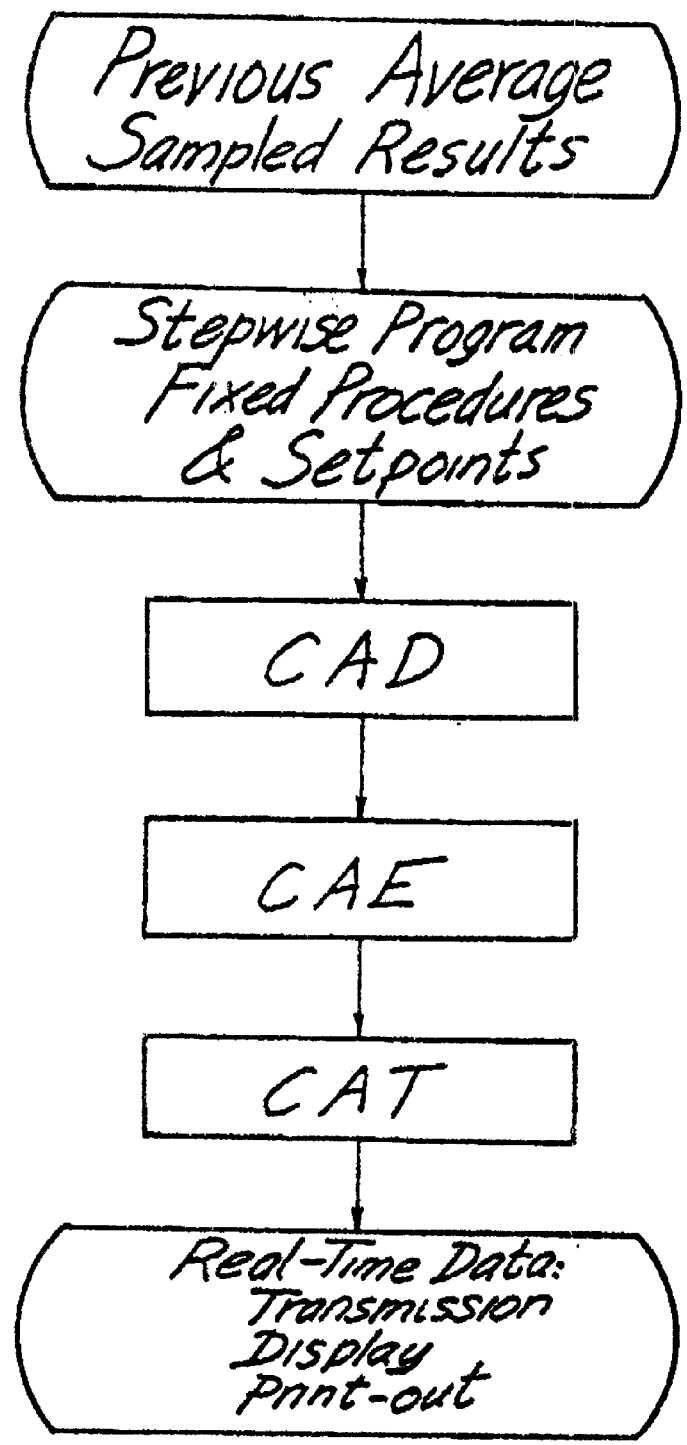
FIG. 1 shows the flowchart of the present automation systems.

Li's prior U.S. Pat. Nos. 5,410,154, 5,079,690, 4,910,660, 4,710,864, 4,772,770, and 4,368,509 are, in their entirety, hereby incorporated by reference.

The method and machine of the invention are useful for self-optimizing various automation systems and processes, in real time and with lightening speeds in the dealing of the many, many variables, which normally require thousands, millions, billions, or more computational steps.

Li's prior patents all deal with the main effects of the control variables only, not the interaction effects between variables. These patents merely indicate that "the U.S. Pat. No. 4,368,509 patent also teaches a method to determine the interaction or combined effect effects, couple (i,j), of any two of the m variables i and j. These interactions are generally neglected, particularly when the units of change of the m variables are small and linear effects predominate." No concrete methods of using these interaction effects were explicitly given. Anyway, the design test matrix in the preferred embodiment of performing 8 tests on 7 control variables simply does not allow determining any interaction effects, as shown below. A main effect is the individual effect of a control variable on the performance of the object. Interaction effect is the total effect of plural control variables, working in combination, on the performance of the object.

The prior Li patents generally work because in most industrial, medical, research, production, or service experiments, not even everyone of the m control variables is important, the percentage of important two-variable interactions are even lower. Three-variable or higher interactions are almost always unimportant. Li's U.S. Pat. No. 4,368,509 patent states that even "two-variable interactions are generally neglected, particularly when the units of change of the m variables are small and linear effects predominate."

The Li's patented methods work are most useful when only the m main effects of the control variables are important. These methods are still useful when some two-variable interaction effects and even a few less important higher-order interaction effects exist. The more complex the problems, the less useful the methods.

In actual practice, these interaction effects can indeed be generally neglected, particularly when the units of change of the m variables are small and linear effects predominate. Still, the U.S. Pat. No. 4,368,509 patent does not show how to integrate these interactions in the automatic R&D in highly fractionally replicated, multivariable experiments, performed rapidly or instantly in multiple cycles or stages. This invention considers the interaction effects.

Yet, if one modifies the Li's self-optimizing methods, both the main effects of control variables and their interaction effects can be determined, even for highly replicated design test matrices. This is shown below.

Modern experiments in various fields often deal with large number of control variables including some important ones. But there are relatively few two-variable interaction effects. Higher-order interaction effects involving more than two variables are even rarer. Even present, most interaction effects are not large enough, and can often be tolerated at least in first approximations. Also, most modern researchers are quite happy with rapidly performing some nearly-impossible, comprehensive (i.e., very large m) experiments on very many (e.g., tens, hundreds, or more) control variables to generate some new knowledge on the complicated technologies. The manufacture of modern semiconductor chips involves, for example, hundreds of precision processing steps each containing many control variables on materials, equipment, parts, procedure, and environment. Limited by complex modern technologies containing many unknowns or control variables, such new knowledge already enables the researchers to compete worldwide.

The number of interaction effects can be determined, as follows. Each of the m control variables has a main effect, or partial derivative, on the performance to be improved or optimized. In be addition, there are $m \times (m-1)/2$ two-variable interaction effects, $m(m-1)(m-2)/3/2$ three-variable interaction effects, ..., and $m!/m!=1$ m-variable interaction effect. For the exemplified case with n=8 and m to be shown later, there are m main effects. There are also 21 two-variable interactions, 35 three-variable interactions, 35 four-variable interactions, 21 five-variable interactions, 7 six-variable interactions, and 1 seven-variable interaction, for a total of 120 interaction effects and 127 main and interaction effects.

Apparently, the 7 variable in 8 tests cannot possibly separate any interaction effects from the main effects of the variables. What the prior Li patents never attempted to do, but this patent will do, is to purify or decontaminate the main effects of the control variables from the interaction effects.

The Li's prior patents, and also in first example on the Worksheet reference given elsewhere for, describing a typical case with n=8 tests for studying m=7 control variables. One of the n=8 test data is used to determine the average result, allowing n−1=7 data for only the 7 main effects of the 7 variables, but nothing for any interaction effects. Yet, in the preferred embodiment given in Li's prior patents, there are 21 (two-variable interactions)+35 (three-variable)+35 (four-variable)+21 (five-variable)+7 (six-variable)+1 (seven-variable)=120 interaction effects. None of the two-variable, three-variable, ..., and seven-variable interaction effects can be estimated. Hence, even the 21 simplest two-variable interaction effects are all confounded, or cross-contaminated with, the 7 main effects. Accordingly, each of the main effects is also not isolated, or separated from many of the 120 interaction effects. The prior Li patents simply never attempted to purify or isolate the main effects. This invention, however, will.

If all the m variables and their interaction effects are important, there will be, for large m, almost infinite number of interaction effects to be determined requiring even more tests to be made, a practical impossibility, as shown above.

Even for a small m=7 variables, there are already 120 interaction effects. In this simple case, the usual problems of combinatorial explosion and computer intractibity already are severe. But modern experiments easily involve hundreds or thousands of control variables. Hence, new optimizing methods must be invented to deal with these complicated cases with large m of over 100, for example.

Table 1 gives a computer-designed test matrix including the test data and resultant calculated main effects. The test matrix table is used as Example 1 of the Worksheet paper referred to above. The preferred example in Li's patents also refer to this test matrix.

TABLE 1

Computer-Designed Test Matrix
Line Experiment: Special Iron Base Alloy    Object: Max strength

| 1 | Factors | A | B | C | D | E | F | G | | |
|---|---|---|---|---|---|---|---|---|---|---|
| 2 | Studied | Cr | Ni | Nb | V | Nb | Mn | C | | |
| 3 | BaseLevel % | 4 | 2 | 0.1 | .02 | 0.1 | 0.4 | 0.4 | | |
| 4 | Unit | 1 | 1 | 0.1 | .02 | 0.1 | 0.1 | 0.1 | | |
| 5 | HighLevel (+1) | 5 | 3 | 0.2 | .04 | 0.2 | 0.5 | 0.5 | M | N |
| 6 | LowLevel (−1) | 3 | 1 | 0 | 0 | 0 | 0.3 | 0.3 | Effects | Variable |

| Sample | Test | | | | | H Data | | | | | |
|---|---|---|---|---|---|---|---|---|---|---|---|
| 1 | 5 | −1 | −1 | −1 | −1 | −1 | −1 | −1 | 1.5 | 4.49 | Average |
| 2 | 8 | +1 | +1 | −1 | −1 | +1 | +1 | −1 | 3.5 | −.09 | B |
| 3 | 1 | +1 | −1 | +1 | −1 | +1 | −1 | +1 | 6.2 | 0.64 | C |
| 4 | 3 | −1 | +1 | +1 | −1 | −1 | +1 | +1 | 3.2 | −.54 | −E |
| 5 | 4 | +1 | −1 | −1 | +1 | −1 | +1 | +1 | 5.3 | 0.89 | D |
| 6 | 6 | −1 | +1 | −1 | +1 | +1 | −1 | +1 | 5.1 | 0.16 | −F |
| 7 | 2 | −1 | −1 | +1 | +1 | +1 | +1 | −1 | 5.3 | −.46 | −G |
| 8 | 7 | +1 | +1 | +1 | +1 | −1 | −1 | −1 | 5.8 | 0.71 | A |

In this test matrix, the test levels, i.e., [−1] for low vs [+1] for high, of the variables for alloying elements A–G (respectively for Cr, Ni, . . . , C) are formed as follows: The eight test levels or conditions for the variable A for element Cr column is first assigned as shown. The eight test levels for the variable B for element Ni in this case are alternately −1 and +1, starting with −1 on sample 1. The eight test levels for the variable C for element Nb are formed by multiplying the respective test levels of columns A for Cr and column B for Ni, subject to the multiplication rule that: $-1 \times (-1) \times (-1) = -1 \times (+1) \times (+1) = -1$ and $-1 \times (-1) \times (+1) = -1 \times (+1) \times (-1) = +1$. Hence, the test levels for variable C are: −1, −1, +1, +1 −1 −1, +1, and +1, respectively obtained by $-1 \times (+1) \times (-1) = -1$, $-1 \times (+1) \times (+1) = -1$, $-1 \times (+1) \times (-1) = +1$, $-1 \times (-1) \times (+1) = +1$, . . .

The eight levels for the variable D (element V) are four −1's followed by four +1's. The test levels on samples 1–8 for the variable E for Nb are formed by multiplying the respective values of columns A for Cr and column D for Ni, subject to the same multiplication rule given above, i.e., −1, +1, +1, −1, −1, +1, +1, and −1. In a similar manner, the test levels on samples 1–8 for variable F (or Mn) are formed by multiplying the respective values of columns B (for Ni) and column D for V; and the test levels on samples 1–8 for the last variable G or carbon are formed by multiplying the respective values of columns C for Mo and column D for V.

The computer program in the U.S. Pat. No. 4,368,509 patent shows that, knowing how the test levels in the seven columns A to G are formed, the main effect of A, for example, is numerically equal to the interaction effects BG, CF, and DE, except for reversed signs. This is the result of the column formation procedure based on the multiplication rule, for the test levels in the unique test matrix given above. Similar results apply to the B triplets: CE, DF, and AG, . . .

As an example, the main effect of a single variable or element G is obtained by first adding the four tests with high-level test conditions (+1), i.e., on samples 3–6 or 6.2+3.2+5.3+5.1=19.8. Subtracting from this sum the four test results with low-level test conditions (−1) on samples 1, 2, 7, and 8 gives: 19.8−1.5−3.5−5.3−5.8=3.7. Dividing the residue 3.7 by the number of tests n=8 gives=+0.46 as the main effect of −G, or G=−0.46, as shown in Table 2. The two-variable interaction effect between the two variables A and B, or AB, is obtained by first adding the two data pairs with AB test level combinations of (−1) (−1) and (+1) (+1) on samples 1, 7 and 2, 8, or 1.5+5.3+3.5+5.8=16.1. Subtracting from this sum the other two data pairs with AB test level combinations of (−1) (+1) and (+1) (−1) on samples 4, 6 and 3,5, or 16.1−3.2−5.1−6.2−5.3=−3.7. Dividing this residue −3.7 by the number of tests n=8 gives identically the same number in sign and magnitude, i.e., −0.46, as the two-level interaction effect of AB, or AB=−0.46. Hence, the computed two-variable interaction effect is AB=−0.46=G, as shown in the first number in the last line of Table 2. Other two-level interaction effects can be similarly computed.

Higher-level interaction effects can also be computed. Three-variable interaction effects such as ABC=AB×C=G×C=−D=−0.89, as shown in Tables 1 and 2. Similarly, four-variable interaction effects such as ABCE=AB×CE=AB×(−B)=−A since A×A=B×B=C×C=D×D=E×E=F×F, and G×G=1.

To summarized the relations: A×B=AB=−G, AC=−F, AD=−E, BC=−E, and BD=−F, BG=−A, CD=−G, CE=−B, CF=−A. Also, DE=−B, DF=−A, DG=−C, EF=−G, EA=−D, EB=−C, FG=−E, FA=−C, FB=−D, GA =−B, GC=−D, and GE=−F. Hence, −1=−ABCD=ABG=ACF=ADE=BCE= BDF=CDG=CEB=CFA=DEA=DFB=DGC=EFG=EAD= EBC=FGE=FAC=FBD=GAB=GCD=GCD, as partly shown in the last column N on "interaction factors". Also, ABC= AB×C=−G×C=D, ABD=AB×D=−G×D=C, . . . These are human-generated or machine-generated interaction-variable identification knowledge base showing the relationships between the main effects of the m=7 variables A–G, and their two-variable or three-variable interaction effects.

Because of the highly fractional replicated design of the design test matrix in Table 1, the main effect of variable A is confounded or contaminated by, or mixed up with, the three two-variable interaction effects BG, DE, and CF, and four three-variable interaction effects BCD, GEF, EDG, and DFG. Those of variables B–G are similarly confounded by their respective triplet two-variable interaction effects CE, DF, and AG, and quadruplet three-variable interaction effects, as shown in Table 2.

The interaction-variable identification knowledge base, given above for the specific n=8 and m=7 test matrix shown in Li's patents, forms an "artificial intelligence", and can be fed into the computer as a look-up table or human expert rules for the computer to automatically plan the new design test matrix specifically to isolate the main effects from the interaction effects, as shown below. The computer can even self-generate the same interaction-variable knowledge base, using the same formation rules for the variable columns in Table 1.

TABLE 2

Interaction-Variable Knowledge Base
for n = 8 and m = 7 Test Matrix of Table 1

| Variable | Two-Variable Interaction | Three-Variable Interaction |
|---|---|---|
| −A | BG, CF, DE | −BCD, −BEF, −CEG, −DFG |
| −B | CE, DF, GA | −ACD, −AEF, −CFG, −DEG |
| −C | DG, EB, FA | −ABD, −AEG, −BFG, −DEF |
| −D | EA, FB, GC | −ABC, −AFG, −BEG, −CEF |
| −E | FG, AD, BC | −ABF, −ACG, −BDG, −CDF |
| −F | GE, AC, BD | −ABE, −ADG, −BCG, −CDE |
| −G | AB, CD, EF | −ACE, −ADF, −BCF, −BDE |

Four-variable interaction effects can also be estimated: As shown above, ABCE=A×BCE=A×BC×E=A×E×E=A. Also, BGDF=BG×DF=(−A)×(−B)=G. That is, ABCE may contaminate A. Also, BGDF may contaminate BG× DF=−ADF, . . . , BG, DF, . . . , or even the main effects of −A=BG, −F=BD, −D=BF, −C=GD, −E=GF, and −B=DF Hence, several main effects of the control variable may be significantly confounded, with two-variable interaction effects BG, DF, . . . , three-variable interaction effects ADF, . . . , and even four-variable interaction effect BDGF. Large higher-order interaction effects, if suspected or expected, can also be estimated and prevented from contaminating one or a few of the designated control variables.

The interaction-variable identification knowledge bases (IVIKB) are extremely important in modern systematic R&D experiments, which almost always involve large number of control variables m and even larger number of tests n, with very large number of control variables m. Up to now, these IVIKB have been human-generated but now will be computer-generated, as shown above. Without these IVIKB one does not know how pure or accurate even the main effects are, particularly when fractionally replicated factorial experiments are performed. Having these IVIKB, however, allows even highly fractionally replicated (e.g., $1/128$ or $1/1,024$ replicated) experiments to keep all the main effects and selected interactions substantially pure, leading to the most meaningful and efficient self-optimization. Such results are not possible with Li's prior patents.

Similar interaction-variable identification knowledge bases can be determined for interaction-variable relationships in differently designed test matrices of the same size (i.e., n=8 and m=7) or larger sizes, with various variable sequence arrangements. The U.S. Pat. No. 4,368,509 patent describes a computer program for the computer to self-plan experiments for n=4, 8, 16, 32, 64, 127, . . . variables.

For example, to expand the 7-variable in a 8-test matrix into an m=15-variable in n=16 test matrix, the new eighth-column for variable H, can be designed by having a block of 8 (−1's) followed by 8 (+1's) to add the 8 more tests (for samples n=9–16). The A and H columns then produce new column I by the multiplication procedure given above so that the main effect A now contains additional two-variable interaction effects HI=A, HA=I, and AI=J; columns B and H give new column J creating new interaction effects HJ=B, BH=J, and BJ=K; column C and G give new column K and three new two-variable interaction effects CG, CK, and GK, Therefore, the main effect of variable H includes at least the two-variable interaction effect AG, that of variable I includes at least the two-variable interaction effect PG, that of variable J contains at least the two-variable interaction effect BG, . . .

In Example 1 of the Worksheet reference given above, the seven variables A–G are respectively assigned to the Cr, Ni, Mo, V, Nb, Mn, and C alloying elements as the control variables. The test results from the first experimental cycle show that variable D, or element V, is the most important variable and has a main effect of 0.89 (See Columns M and N). The variable A, or element Cr, is the next important variable and has a main effect of 0.71. Variable C, or element Mo, is the third most important and has a main effect of 0.64. The most likely important two-variable interaction effects are therefore DA=−E, and less so DC=−G.

To isolate the main effect of variable A from the expected two-variable interaction effects DA and DC, a second or subsequent experimental cycle may have a new design test matrix which is identical to the design test matrix in the first experiment cycle, except to leave the E and G columns blank to not test any variables or alloying elements therein. In this way, this new designed test matrix specifically reserves two variable spaces for these expected two-variable interaction effects DA and DC to appear therein, and not to contaminate, or appear as at least a part of, the main effect of the designated control variable D for element V.

The newly designated control variable D will then have their main effects unconfounded or uncontaminated by, or not mixed up with, the two expected two-variable interaction effects DA and DC. Since the maximum m for n=8 is 7, only five control variables can now be tested in the same test matrix, because the two columns E and G are saved respectively for the two two-variable interaction effects DA and DC.

Using the same test matrix given above for n=8 but m=3 only, all the 3 variable and their interaction effects can be estimated: i.e., main effects A, B, and C; two-variable interaction effects AB, AC, and BC; and three-variable interaction effect ABC. This still leaves 1 "effect" for the experimental error. More accurate main effects, interaction effects, and experimental errors may be had by simply increasing n from 8 to 16 (with m=3–10), to 32 (with m=5 to 30), or to 64 . . .

The minimum number of tests, n, required to test m variables and recover all the two-variable interaction effects, is n=m (main effects)+m(m−1)/2 two-variable interaction effects+1 (average)=$(m^2+m+2)/2$. For n=16 tests, for example, the maximum number of control variables is m=5. Also, for n=32, m=7; and for n=64, m=10; . . .

For m=10, since most of the 10×9/2=45 two-variable interaction effects are not important, more than 10 variables, such as 11 to maybe 20, may even be designed into the n=64 test matrix. The required interaction-variable identification knowledge bases, similar to those shown in Table II, can easily be provided by the human or the computer for different values of n and m.

Several other ways are possible to identify the effect of at least the two-variable interactions, or to see if a main effect of a designated control variable is indeed the true, unmodified main effect of the designated control variable. If during the first self-optimizing cycle in the case of n=8, m=7, the experiment determines that variable A has the most important main effect, different possibilities arise: 1) variable A is indeed important, and the determined main effect A is substantially a true main effect of A only; 2) the main effect is mixed up with one, two or all three of the two-variable interaction effects BG, CF, and DE. If in the second cycle, we still have an n=8, but an m=3, one can then determine all 3 main effects and 3 two-variable interaction effects, i.e., A, B, C, AB, AC, BC; and even ABC, assuming the tests are fairly reproducible with small experimental errors. With large experimental errors, the same experiment may be repeated. For the same n=8, but m=4 to 6, we cannot determine even all the two-variable interaction effects. We may neglect all three-variable interaction effects, and still determine 1 to 3 specific two-variable interaction effects, using the knowledge bases on the interaction-variable relations, as shown above.

We can also use the same n=8 and m=4 to 7, but interchange the sequence of the variables. For example, variables or columns A–G are now used for, e.g., Mo, Mn, Cr, Ni, C, V, and Nb. If no interactions are important, the estimated main effects will be nearly the same as those given in the previous experimental cycle, but will now appear in different columns as in the first experiment. This indicates good agreement of results and lack of important variable interactions. Any significant deviations, however, point to the presence of interaction effects. If element V now in column F is still the most important, its important main effect will not appear as variable D in the Worksheet example, but variable F, because of the changed sequence. The possible two-variable interaction effects containing the most important element V will now be AF=−C for elements Mo—V and Cr, BF=−D for elements Mn—V and Ni, . . . These expected two-variable interaction effects involving the most important element V, if important, will therefore respectively appear in columns C, D, of the worksheet, according to the interaction-variable identification knowledge bases shown above.

Provided with the interaction-variable identification knowledge bases given above, the computer can readily plan the minimum number of new designed test matrices to find, in the shortest time with a minimum number of automatic experimental cycles: 1) the most important variables; 2) their fairly true main effects with signs; 3) if interaction effects are present, the important two-variable interaction effects and their signs and magnitudes; 4) the best way to isolate the control variables from the interaction effects between variables to insure minimum cross-contamination of the main effects and interaction effects; 5) with the substantially pure main effects, the steepest ascent path on a multi-dimensional response surface for rapidly achieving an optimum point; and 6) other answers.

A computer program can easily be designed into the new self-optimizing method for using the interaction-variable interaction knowledge bases to handle not only main effects as in the prior Li's patents, but also some, most, or all two-variable interaction effects, and even selected higher-order interaction effects. Here, the computer runs the first experimental cycle according to the Li's prior patents. The most important variables (having at least a minimum "effect" at least, e.g., three or five times the experimental error) are determined. A new design test matrix is then computer-planned based on: 1) these newly found important variables; 2) some simple rules given above; and 3) the interaction-variable identification knowledge base provided. The new designed test matrices for one or more subsequent automatic experimental cycles may be specially computer-planned to insure, e.g., that: 1) all or most of the main effects are estimated; 2) most of or all the expected two-variable interaction effects are determined; 3) all the two-variable interaction effects containing the most important one, two, or . . . variables are determined; 4) some or all of the two-variable and three-variable interaction effects are determined; . . .

The computer-planned, new design test matrices may also run not around an previous optimum variable combination as the experimental center according to Li's prior patents, but at a tolerable distance away from this center, to search for the possibly much better global optimum, rather than a local optimum. The tolerable distance is such that it is still within, e.g., the production specification. The m distances in the m dimensions representing deviations in the m variables from the previous optimum point may even be used as the new control variables, with or without follow-up by the method of steepest ascent given in the Li's patents, to insure better accuracy of results.

The prior Li patents not only overcome the very serious combinatorial explosion and computer intractibility problems, but provide efficient experimental designs to generate new knowledge bases rapidly, reliably, and at low cost. However, no interaction effects are dealt with. This invention handles the interaction problems in several ways to make-the self-optimizing methods and machines more useful and accurate. This new invention also makes it possible to achieve not only local optimum points, but possibly the vastly superior global optimum point. This is because the starting points of the subsequent optimizing cycles are not fixed, but may move somewhat around the previous optimum points, departing from the local optimum points subject, of course, to certain constraints on the production specifications, parts, material, equipment, procedures, and environment.

FIG. 1 shows the flowchart for the present automation systems. These systems totally depend on the imperfect and error-prone human knowledge bases from averaged previous sampled results. There are no mechanism to eliminate, suppress, or even detect errors from any sources. Hence, errors in, errors out.

A fundamental flaw in present automation systems is to assume that there exist human experts who know exactly and accurately everything: the exact number and type of important variables and their interactions, system dynamics models, detailed solutions of the intricately coupled control equations, exact control constants, and optimal setpoints. In reality, this is far from the truth.

As a result, wrong models based on incomplete or imperfect understanding often must be used, with misleading, dangerous, or disastrous result. Classical examples include the Space Shuttle disaster, Korean Airline shoot-down, Chernoby reactor failure, and Napoleon's and Hitler's Russian invasions. In the last example. Napoleon or Hitler gathered all the French, German or other experts to help program the step-by-step operational procedures for his human and mechanical robots, based on meticulously collected massive, accurate, scientific, but misleading previous sampled weather data, with disastrous results to his whole army on the Eastern Front.

Figure 2:
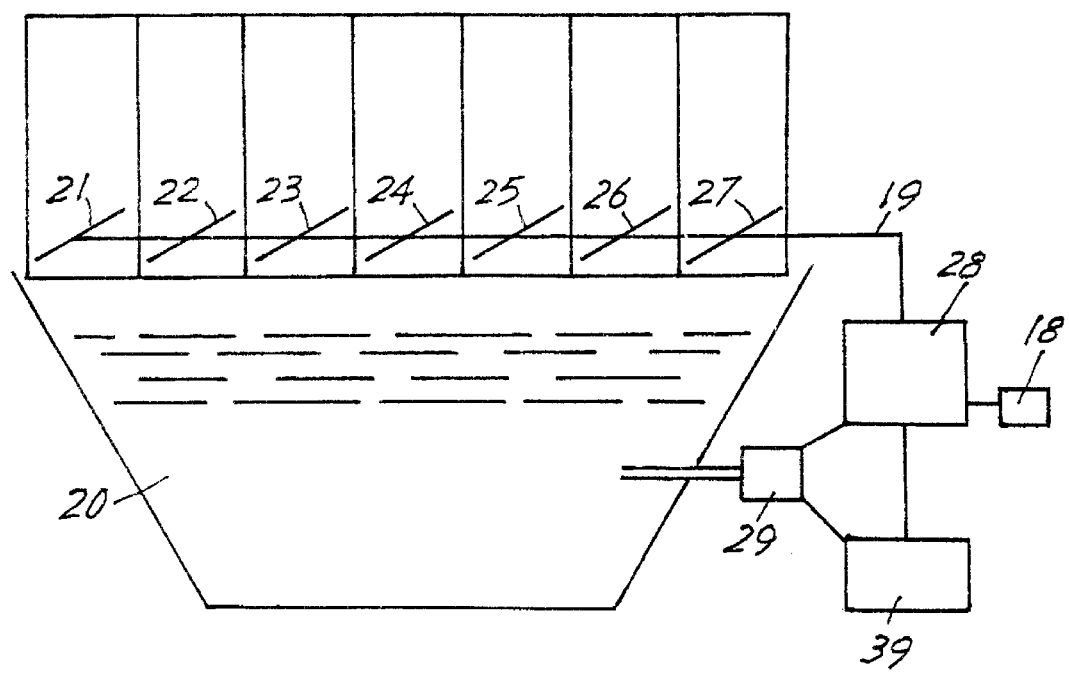
FIG. 2 shows a self-optimizing furnace for making special iron-base alloys.

FIG. 2 of this application, and FIG. 1 of U.S. Pat. Nos. 4,710,864 and 4,472,770 patents as well as FIG. 2 of the U.S. Pat. No. 4,368,509 patent, all show a machine or system 20 in the form of a furnace to make special iron-base alloys. The furnace self-optimizes, in real time, relative to a specific performance, e.g., hot tensile strength of the resultant alloy produced on the furnace, in response to variations in a fixed number m of variables. For ease of illustration, m is only 7 and all these 7 variables are 7 alloying elements. The composition of these seven alloying elements can be changed continuously and without steps. These variables are continuous variables. The self-optimizing methods is also useful for continuous variables.

This machine or furnace has a built-in microprocessor 28 which first self-plans a statistically designed test matrix of alloying procedures (or conditions) for the automatic R&D, according to the method and computer program given in the U.S. Pat. No. 4,368,509 patent. Specifically, 8 tests or alloying compositions are planned.

A complete seven-factor (at two levels each) experiment requires $2^7=128$ tests. The computer-designed fractional factorial designed experiment here plans only 8 tests. That is, only a small fraction (i.e., one-sixteenth) of the required number of 128. Technically, this is called a one-sixteenth fractional factorial experiment.

The microprocessor then directs, through the transmission line 19, the seven actuators or alloying elements feeders 21–27 to feed successively according to the computer-planned test matrix. The furnace sequentially makes the 8 (=n) successive tests or melts of iron-base alloys. These alloys are sampled by sampler 29 and tested on tester 39. The test results on the critical product performance, i.e., hot tensile strength of the resultant alloys, are transmitted to the microprocessor 28 (with attached memory 18) for data analyses to compute, as shown in the U.S. Pat. No. 4,368,509 patent, the desired functional relationships including: main effects of the various variables or alloying elements, the instantaneous optimum combination of the variables and/or the steepest ascent path. The microprocessor 28 then redirects the feeders 21–27 to provide the optimum combination of the alloying elements into the molten iron melt in the furnace 20 for optimized alloy manufacture. Periodically, i.e., every hour or minute, (or second or millisecond), the planning, sampling, testing, data analyzing, and feeders actuating and setting are repeated so that the furnace conditions are always maintained optimal. Other details of the principle, operation and results of the self-optimizing method and machine are provided in my prior patents, applications, and reference U.S. patents and applications elsewhere incorporated.

The seven actuators 21–27 on the furnace 20 are electrically connected, directly by transmission line 29 or indirectly through an intervening instrument, to the computer or microprocessor 28 to supply the furnace or machine 20 with the required alloying elements for performing the n=8 tests according to a statistically computer-designed test matrix such as is shown as Table 1. Further, the furnace's performance in making high hot strength steel is sensed by the sampler 29 and tester 39. Both the sampler and tester are, directly or indirectly, electrically connected to the computer 28 to generate test results. The same computer 28 instantly analyzes the electrically transmitted test results to computer: to compute the main effects of the 7 control variables, to estimate selected interaction effects of the control variables, and to determine an optimal combination of these control variables. This instantly computer-generated new knowledge base in the field of steel making is then immediately applied to the same furnace for feeding, through the same actuators 21–27, the furnace to produce optimized-quality steel.

Minor modification of the above self-optimizing machine yields drug-searching or administering machine continuously self-optimized to dispense the instantly optimum combinations of drugs such as chemicals, plants, animal tissues, bacteria, genetic or biochemical materials, . . . through the feeders 21–27 into a drug-preparing or feeding device. Such a device, in the form of hypodermic needle, mouth-feeder, or implanted feeder, will dispense the optimum combination of drugs either periodically or continuously. The tester 29 is used here to test the medical conditions of the human, animal, or plant patient as to, for example, vital functions of the organs, chemistry of the blood, urine, and other body liquids; or other data or performances to be optimized. Such a self-optimizing machine can also feed food, nutrients, vitamins, or even educational or training materials to plants, bacteria, animals, or humans with optimal equipment, procedures, and environment for achieving self-optimized physical or mental growth conditions of the object at all times.

In searching for drugs, medically treating patients, or training students, each object, whether drug, patient, or student, is also suitably connected, directly or indirectly to the computer. The computer similarly designs test matrices, executes the tests according to the test matrices, often even senses the performance test results, analyzes the test results, and implements the optimized results. The object is also suitable connected, directly or indirectly, to both the computer and the sensors.

The connections may be electrical or optical for, for example, sensing the temperature or color of the steel melt with electrooptical sensors such as thermocouples or radiation pyrometers. The connections may also be electromechanical for sensing mechanical force, acceleration, speed, proximity, or smoothness when training, for example, athletes. Thermal sensors are useful for training athletes or students, while chemical sensors are needed for medically treating patients. These different sensors are directly or indirectly connected to both the computer and the object whose performance is to be optimized.

To search or screen among hundreds, thousands, or even millions of drugs for a few that can cure a critical disease such as cancer or Aids, my sequential screening technique given in the Journal of American Statistical Association, Vol. 57, pp. 455–477, 1962, may be used, as has been disclosed in my U.S. Pat. No. 4,368,509 patent referred above. This method is especially useful when dealing with many variables with only a small fraction (e.g., no more than 5%) of important variables. Even interaction effects can be handled. The cited Journal article only deal with two-variable interactions. In this way, optimum combinations of drugs can be systematically researched and found, to be delivered to the patient in real time.

Figure 3:
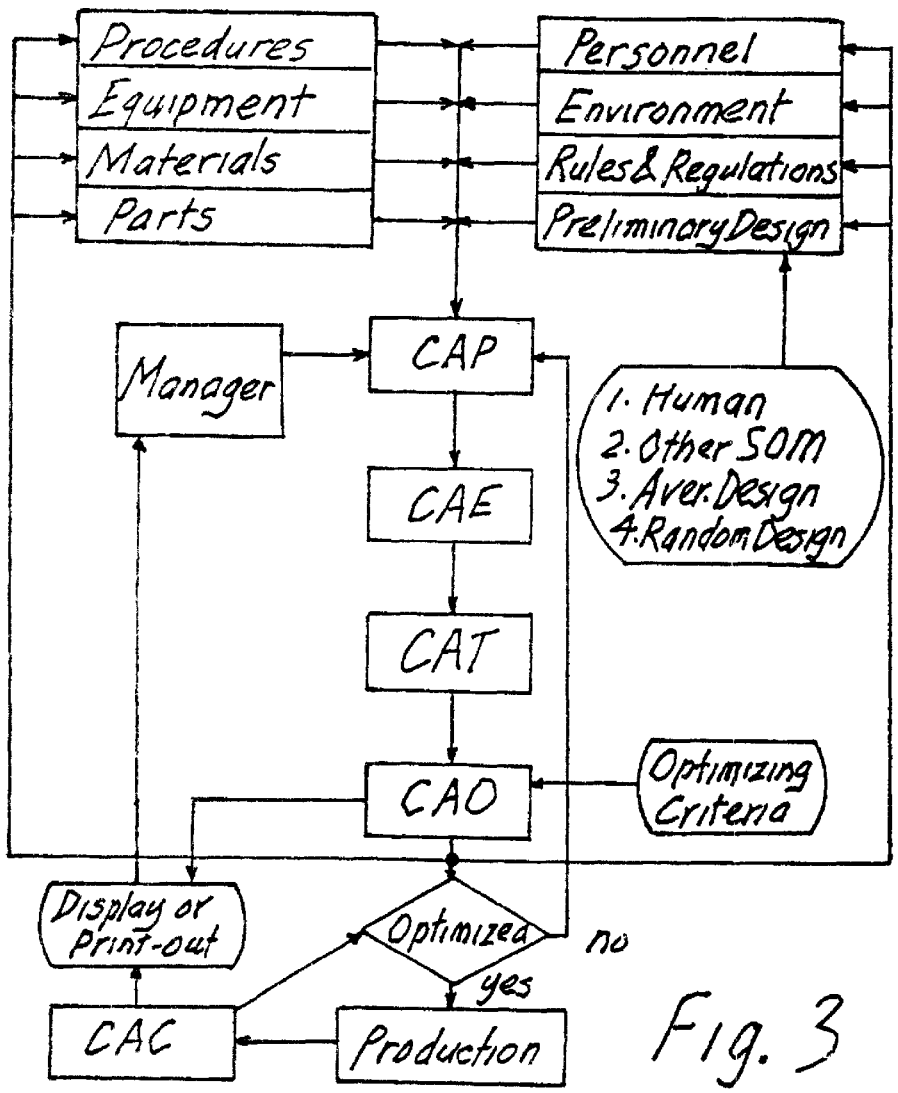
FIG. 3 shows the flowchart of my self-optimizing machine and method.

The flowchart of the new system is shown in FIG. 3. Multiple sensors sense numerical data (having much higher information content than yes-no question-answers in present expert systems) on the system and product or service qualities and also on the many interacting, independent or controlling variables in various categories such as procedures, equipment, materials, parts, and environment. With this information, the microprocessor (e.g., 28 in FIG. 2) continuously or instantly and automatically plans (CAP or AIP) efficient statistical experiments around an experimental point in the m-dimensional experimental region according to, e.g., designs of the highly fractional replicate type as shown in the U.S. Pat. No. 4,368,509 patent and the Worksheet paper given in Chemical Engineering, Apr. 2, 1958.

Without interrupting the system in the performance of its assigned tasks, i.e., automatic manufacturing or servicing, the computer-planned experiments are continuously and automatically executed (CAE) to achieve successively the required combinations of variable settings (or elemental compositions) through, e.g., the actuators 21–27 in FIG. 2 for continuous and automatic testing (CAT). Test results on the dependent performance variables, e.g., hot tensile strength, or other system and product/service performance are continuously, automatically, and instantly analyzed and optimized or maximized (CAO), based on specified or computed optimizing criteria, such as the various system and task goals in proper weighing indices for a particular situation (e.g., only maximum hot strength in the example of FIG. 2). More specifically, the instantaneous optimal variables combinations (or elemental compositions) are continuously determined and, through actuators, set and reset.

The U.S. Pat. No. 4,368,509 patent discloses the specific software to compute the main effect or partial derivatives of the m variables on the m-dimensional response surface. These derivatives provide the basis for climbing the hot-strength response mountain along the steepest ascent path, to reach the instantaneous optimum point in the m-dimensional experimental region via the method fully described in the prior art, particularly the U.S. Pat. No. 4,368,509 patent and my Worksheet paper referred to therein. Alternately, the microprocessor can instantly rank the n test results to determine the optimum performance on test k. By definition, test k has the instantaneous optimum variables combination. The next self-optimizing cycle, if needed, will then involve automatic R&D around this new experimental point represented by test k.

The self-optimizing method of this invention deals only on the main effects of single variables, without regard to their interaction effects. The optimum variable combinations may be only local optimum variable combinations. To search the possibly much better global optimum variable combinations, the subsequent new designed experiment or self-optimizing cycle or cycles should be centered not at the immediately previous optimum combination of the m control variables represented by test k, but away therefrom, at a point having m selected deviations in the m directions or dimensions therefrom. In addition, for efficient self-optimizing operation, the m selected deviations should be used as the new selected control variables in the at least one subsequent designed automatic R&D experiment.

The U.S. Pat. No. 4,368,509 patent also teaches a method to determine the interaction or combined effects, couple (i,j), of any two of the m variables i and j. These interactions are generally neglected, particularly when the units of change of the m variables are small and linear effects predominate.

Some sensing or actuating, or both, may be done by the computer itself, as in an example on computerized teaching to be shown below. All the sensed system and product or service performance data are then evaluated to see if the system is optimized. If not, the above optimizing cycle is repeated. If optimized, operation of the system is continued, with 100% continuous and automatic checking or quality control (CAC or CQC) of all the sensed performance data for 100% traceability.

The results of the data analyses in the CAO and CAC steps can be real-time displayed or printed-out on a word-processor in the form of research papers, reports or operating manuals. These papers, reports, and manuals describe comprehensive statistical experiments; instantaneous, complex system dynamics; functional relationships between the control variables and the system and product or service performances; new and realistic specifications on these performances; best system modifications and operating procedures; optimal raw material compositions, vendors, lots, and conditions; best equipment layout; and other rapidly generated, reliable, but low-cost knowledge bases.

The display or print-out is designed for the "manager" of the self-optimizing automation. This manager may be a person, an animal, a machine, a learning student, or a sick patient under treatment. The manager cannot analyze, even read, the very massive, complex raw experimental data, or even the summarized, computer-generated conclusions, especially in real time. But the computer can also provide multiple choices of simple reward-risk choices from the highly efficient experiments for the manager to select to decide, e.g., whether to continue the next self-optimizing cycle. See FIG. 3. The computer can also computer-code in real time into the computer-generated knowledge bases and conclusions into, e.g., expert rules, advices, or inference engine in display or printed-out form.

The above display or print-out is not for the raw sensed data, as is usually the case. Rather, it is commercially valuable conclusions, recommendations, and other knowledge bases, derived from the comprehensive, systematic, relevant, and exactly but automatically executed R&D. Most of such information will be totally new and not obtainable for months or years even by teams of specialists because of the combinatorial explosion problems mentioned above. The computer-generated new knowledge bases can be rapidly or even instantly applied onto an object to improve or optimize the performance thereof. These knowledge bases should be applied onto the object sufficiently soon after the coding step to have a maximum and timely effect on improving or optimizing the performance. Specificaly, the automatically generated and coded new knowledge bases are applied onto an object within a specified delay time after the computer-generated new knowledge bases are coded. This specified delay time may be selected from the group consisting of 1 second, 1 millisecond, and 1 microsecond.

These low-cost and unbiased knowledge bases are, furthermore, manufactured in great bulk at very low cost, and are instantly machine-codeable so that "expert system" can be easily generated at a small fraction of the cost and time compared to the conventional approach. The development of expert systems is a well-developed art. See, for example, P. Klahr's book on "Expert Systems: Techniques, Tools, and Applications," published by Addison-Wesley in 1986; and W. B. Genarter's paper entitled: "Expert Systems: Limited but Powerful," in IEEE Spectrum, August, 1983.

Each expert system typically has as its components the knowledge base, an inference engine, a knowledge acquisition module, and explanatory interface.

My self-optimizing machine always has a knowledge-acquisition module to generate in the CAO and CAC steps the required knowledge bases in a particular domain of interest. These knowledge bases are automatically codeable into an inference engine to provide "advices" as its outputs. In the steel-making furnace operation given above, for example, the machine-generated rules may be: IF hot strength is needed, THEN in the order of decreasing effectiveness one should increase V, Cr, Mo, Nb, and C, but decrease Mn and Ni (See "Effect" column in Example of the Worksheet reference);" "IF maximum percentage effect is needed, THEN one should add V;" and "IF maximum hot strength is needed, THEN use the following best combination of the seven elements: 10.4% Cr. 1.2% Ni, 0.66% Mo, 0.18% V, 0.58% Nb, 0.24% Mn, and 0.80% C," as indicated in line 25, Trial 11 of Example 1. Also, "IF V is 0.18% and Cr is 10.4%, THEN Mo should be 0.66% and Nb 0.24%-". These rules can easily be codified and printed out with standard formats requiring merely the filling of the variable names such as Cr, Ni, Mo, . . . and the numerical values such as 10.4, 1.2, 0.66, . . .

Thus, my self-optimizing machine readily and automatically generates these and other similar rules in computer-coded form ready for use as instant machine expert systems. The displays, print-outs, and transmitted data (FIG. 3) provide the "explanatory interface," as in the conventional expert systems.

To fully utilize my self-optimizing machine, however, these "rules" are preferentially instantly and automatically implemented through actuators without introducing any delays or errors due to the presence of humans in the loops.

Even probabilistic statements in the rules can be provided, if needed, because the automatic statistical experimentation during each self-optimizing or R&D cycle provides a valid "experimental error". From this error confidence limits can be derived. The errors in each estimated main effect of control variables, for example, can thus be estimated. See standard textbooks on statistics.

A new knowledge base can now be rapidly computer-generated by automatic computerized experimentation performed on the very object to be optimized. The automatic computerized experiments employ designed statistical experiments of the fractional factorial type, and are computer-designed to insure that a main effect of a designated control variable is separated from at least one expected two-variable interaction effect. This knowledge base can even be computer-coded in real time, for immediate, direct application on the object to achieve instant optimal results.

The rapidly computer-generated knowledge bases, obtained through computerized automatic R&D on the object, can be immediately applied onto the object to optimize or improve its performance. In this way, my self-optimizing machine solves the present main bottleneck in the development of expert systems, i.e., the acquisition of knowledge in computer-usable form; and meets the keenly felt need to automate the knowledge generation process.

Thus, the automatically machine-generated information of this invention forms the basis of a new kind of artificial intelligence or knowledge bases. These bases are comprehensive in the number of control variables, the range of these variables, and the scope of the experimental region. These knowledge bases are also inexpensive, relevant, timely, unbiased, reliable, less error-prone, and possibly instantly available.

The self-optimizing process is performed on the very automation machine or object of interest and in actual operation, with the exact materials, parts, procedures, equipment, and environment. In addition, the test data are quickly collected, analyzed, and used on the very machine or object to be optimized during the same actual operation. Hence, the various ever-present and often critical errors of sampling, extrapolation, time delay, and scaling-up are minimized or eliminated.

Note that these comptuter-generated new knowledge bases in a specific domain of technology are at least one or two orders of magnitude more comprehensive, error-free, unbiased, but less costly than human-generated knowledge bases in the same specific domain of technology. These new knowledge bases are comprehensive because they treat large number of control variables m such as 15, 31, 63, 127, 255, 511, 1023, or more. They can be telecommunicated to a computer for use not as a preliminary design in starting new automatic computerized experimentation, but as an embedded machine expert system that: 1) understands the computer-generated knowledge bases, 2) compares different parts of the knowledge bases, 3) selects relevant part thereof, 4) diagnoses characteristics of existing process or product, makes logical decisions after the comparisons, 5) synthesizes new processing steps or product components based on the logical decisions, and prescribes a new synthesized recipe for achieving optimal performance of an object possibly without any additional new automatic computerized experiments. In general, no more than two or three automatic computerized experiments are needed for optimization or maximum improvement. This is totally different from Li's U.S. Pat. No. 4,472,770 method where the optimizing recipe numbers are telecommunicated merely for use as preliminary designs. In this case, the telecommunication at best only embeds a technician who uses merely skills to follow orders without contributing any intelligence in the optimization process.

A unique feature of my self-optimizing technology is that the computing time in each self-optimizing or automatic R&D cycle may take only milliseconds or microseconds, as will be shown. Delays due to mass and thermal inertia or diffusion effects, however, generally are much larger than this negligible computing time. These motioning, positioning, heating, cooling, and stabilizing delays primarily determine the duration of each automatic R&D or self-optimizing cycle. Still, with suitable actuators, sensors, and equipment design or layout, the optimizing cycles may indeed be very short. These short or even instant optimizing cycles make the optimizing process not only simple and possibly, but in real time and often practically continuous, even for complex, rapidly changing conditions or processes involving hundreds or thousands of control variables with interactions.

Because of the efficient statistical designs and simplified data analyses, the CAP-CAE-CAT-CAO optimizing cycles may each take only a small fraction of a minute or second, if the testing, actuating, and data sensing have minimal delays. As a specific example, dealing with a case involving (m=) 127 variables at two levels each normally would require making $n=2^{127}=1.701\times10^{38}$ conventional tests, and about $N=3\times n\times n=2.895\times10^{76}$ multiplications, or $8.738\times10^{43}$ years on a nanosecond computer for the data analyses. Using the technique described here and in the U.S. Pat. No. 4,368,509 patent, it now requires making only 128 ($n=2^7$, not $2^{127}$) tests, and N=n×logarithm of n to the base of 2=218×7=896 additions/subtractions and 128 divisions or 896 shifts to the right, for a total of 1,024 or 1,792 computational steps or 1.02 or 1.79 microseconds, respectively, on the same nanosecond computer. Even on a microsecond computer, the total data analysis time for each self-optimizing cycle with 127 variables is merely 1.02 or 1.79 milliseconds.

Most modern self-optimizing procedures with less than 127 control variables can therefore easily be done within about 1 minute, 1 second, 1 ms, or even 1 ns of computing time. Since the CAP step also takes less than 1 microsecond or millisecond on the respective nanosecond or microsecond computer, if sensing, actuating, and testing (CAE and CAT) are nearly instantaneous, the entire optimizing cycle or system response time could be a fraction of a minute or second, through a millisecond down to a microsecond or even nanosecond, or at least sufficiently fast to for most of modern technologies. The new system would thus make many "impossibly complex" optimizing tasks not only possible but practical and possibly in real-time.

In operation, the self-optimizing machine first reads the optimizing criteria on the machine or product or service performances with their different weighing indices, and the number of control variables with their allowable ranges. It is then totally up to the new machine, all by itself, to continuously plan, execute, analyze, optimize, and implement the instantaneous optimal variable combinations or automatically determined setpoints.

Any pre-existing knowledge bases, if available, are used merely in the preliminary design for each variable in the first self-optimizing or automatic R&D cycle only. If no knowledge bases are available, the self-optimizing machine starts the preliminary design for each continuous variable with the average or midpoint of, even a random number within, the given allowable range. After the first cycle, comprehensive, relevant, timely, and error-free new knowledge bases will be produced. Even these new knowledge bases will, in turn, be immediately replaced by still newer and more accurate or refined knowledge bases with additional self-optimizing cycles. As shown above, each such self-optimizing cycle may be very short if rapid sensing, actuating, and testing are possible.

As a by-product, the system generates, prints out, or transmits to other self-optimizing machines vast quantities of the error-free, constantly updated, and otherwise unavailable and very expensive knowledge bases. These knowledge bases are suitable for human uses for innovations, hypotheses testing, and advanced product development. These knowledge bases are also useful for present automation systems as preliminary designs for other self-optimizing machines, or for the development of instant expert systems as described above.

This transfer of intelligence from machine to humans or to other machines may signal the beginning of the Third Industrial Revolution.

Advantages of the self-optimizing machine are many, particularly when compared to the present automation systems. The purpose of present automation systems is to control only a few arbitrarily selected variables within specified limits. These limits most likely are not optimal, as shown above. Even the selected control variables do not always certainly or reliably affect the productivity and product or service cost/qualities. Much, therefore, depends on the reliability of the knowledge bases; the many assumptions, extrapolations, and statistical variations; and equipment conditions, calibrations, and drifts.

On the other hand, my self-optimizing machine always optimizes directly the bottom line, i.e., productivity, cost, and product or service qualities. Improper control models or constants, and variable setpoints can do little harm. Because of the unique operation flowchart (FIG. 3), many of the deficiencies of present systems are minimized or eliminated. In particular, the condition of the sensors and actuators, have minimal effects on optimizing the bottom line.

When the control variables are sensed with miscalibrated sensors or set with imperfect actuators, for example, the resultant "instantaneous optimal combinations" as sensed with the miscalibrated sensors and set with the imperfect actuators are still the most relevant, useful, and best for the particular self-optimizing machine at the specific time with the particular equipment and environment to achieve the required optimizing criteria or goals. The miscalibrations and imperfections are always exactly self-compensating.

For example, in the conventional system, the specified setpoint may be 500° C., to be sensed by a K-type or Chromel-Alumel thermocouple. If, however, the K-type thermocouple is miscalibrated or if a J-type Iron-Constantan thermocouple is misused, the results can be dangerous in present automation systems. However, in my self-optimizing machine, the zero and proportionality constant calibrations of the thermocouple are unimportant. Even a misuse of the thermocouple merely changes the proportionality constant with a proportional change in the apparent main "effects," but no reduced efficiency in reaching the optimized bottom line of profits, productivities, and product qualities.

As another example, a present automatic processing system may specify an optimal control temperature of 100° F. Assume a Fahrenheit thermometer is specified for sensing, but a Centigrade thermometer is actually misused with a zero-point correction off by 32° F. and a proportionality constant off by (9/5−1)=80%. The conventionally controlled process will then be out of control. Still, in my self-optimizing machine, the automatic R&D will determine and set at the self-determined, true instantaneous optimal combinations (or setpoints). The response surface will still be climbed in the steepest ascent manner, even though this response surface has been shifted laterally (because of the zero miscorrection) and has a different height scale (because of a changed proportionality constant).

Sensor zero miscalibrations of more than 32° F. or ($32/100$= 32%) off the optimal set value) and proportionality miscalibration of more than 80% in temperature, pressure, voltages, current, dimensions, velocities, flow rates, . . . can be similarly tolerated. Actuator or other equipment imperfections due to friction, wear, drags, backlashes, damages, and too wide clearances are also tolerable for similar reasons, because of the statistical averaging effects between tests of the same or different self-optimizing cycles. Similarly, equipment drifts are also tolerable if the automatic R&D cycle time (e.g., 1 or 2/½ sec) is less than the drift cycle time (e.g., 5 or 10 sec).

Hence, with my self-optimizing machine, achieving the truly meaningful optimizing goals on product or service costs or qualities is no longer a hostage to the quality of the existing knowledge bases, the correctness of the control models or equations, the exactness of the given setpoints, and the conditions of the equipment.

My optimizing machine is thus flexible and error-tolerate and fault-tolerant. It can handle practically any number of important, possibly important, or interacting variables, on the most reliable microprocessors, without much regard to the computing speed or memory size. Redundancy of parallel processing may, however, also be employed for additional reliability and computer speed, respectively.

The self-optimizing machine is, therefore, smarter; better; smaller; lighter; faster; and more reliable or flexible than present automation systems, yet may save enormously for its employers while mass-producing low-cost but uniformly optimal-quality products or services.

Most importantly, the self-optimizing machine can timely perform the necessary, complicated optimizing tasks for the modern, complex yet rapidly changing automation tasks that probably no other systems can.

Further, even the minimum number of tests in each R&D cycle still provides virtual statistical replications, and thus yields averaging effects to counter the statistical fluctuations and chance combination effects due to sampling, actuator backlashes, and equipment conditions, . . . This is partly because the efficient statistical designs are so balanced that, assuming no interactions, the main effect of each control variable can be independently evaluated as if the entire experiment were performed just for this one variable with the other variables all kept constant.

During each automatic R&D or self-optimizing cycle, the self-optimizing machine parallelly and automatically performs, depending on need, all or at least two or three of the following tasks or operations:

1. Comprehensive and systematic R&D;
2. If needed, determination of the main effects of the control variables uncontaminated by the variable interactions;
3. Optimal manufacturing designs or servicing procedures;
4. 100% quality control;
5. Procedure or equipment modifications;
6. Materials and parts selections;
7. Use of environmental changes for maximum benefits;
8. Prototype or finished products manufacturing; and
9. Rapid generation of reliable and comprehensive knowledge bases.

Hence, this new machine should be significantly improved over conventional automation systems (FIG. 1). These later systems perform the various tasks listed above sequentially and successively, and even this very slowly, inefficiently, and often unreliably.

It can readily be seen that the self-optimizing method and machine of the invention can be used for many automation systems in various industries including manufacturing, servicing, office, military, farming, medical, and education.

More specifically, the invention is also useful to self-optimize, in real time, the physical or mental growth activities of a living being selected from the group consisting of human, animal, bacteria, virus, germs, and plant. Such activities include: body growth, physical strengthening, sporting, and learning various skills such as speaking, singing, reading, memorizing, swimming, foreign language, and other subjects. The flowchart of FIG. 3 is equally applicable in these cases even with the same microprocessor and basic computer programs for the CAP, CAE, CAT, and CAO steps, as described above. The sensors and actuators used, however, are generally different from those used in the self-optimizing furnace of FIG. 2. The specific performance or activity characteristic to be optimized will, of course, also vary depending on the activities or conditions involved ranging, e.g., from learning speed, comprehension, growth rate, error frequency, to others, as is well known to the skilled person. The controlled variables also may include growing, training, and educating procedures; training or growing materials (food, books, recorded tapes or disks, . . . ); parts; equipment; and environment (such as temperature, lighting, humidity, lighting, noise or music type, intensity, and tempo, . . . ).

To self-optimize in real time the learning process of a human such as a child, one may, according to the description given above and in the U.S. Pat. No. 4,710,864 patent, sequentially cause the human to do the specific learning activity n times in succession while the conditions of the m selected variables are simultaneously changed according to a computer-designed test matrix. The m variables may relate to the learning equipment, materials, parts, procedures, and environment, while the optimizing performance the speed and comprehension of learning, possibly directly measured and scored by the microprocessor itself. Similarly, in a self-optimized growth process of objects such as human, animal, bacteria, virus, germs, or plant, the object is caused to grow in n different ways by suitably actuating the m growth variables according to the designed test matrix. The specific performance to be optimized here is usually the growth rate, maximum growth, cost per given growth, and environment impact.

The self-optimizing method of the invention is also useful for other financial, business, office, factory, military, educational, and scientific applications. Even many computer softwares can be not only automatically but optimally generated, modified, and used. Here, the same flowchart of FIG. 3 is used. The optimizing criteria may be the usual productivities, product or service costs, profits, and reliability, accuracy, or robustness. The physical material and environment variables are usually unimportant. The procedural variables may involve the different merging and interacting of various programs or parts of the same program; use of different mathematical or physical/chemical models, equations, or formulas; numerical computational techniques such as finite element analyses, differentiation or integration, interpolation or extrapolation, root-determining, in different softwares. The procedures or parts variables may also involve the finite element grid shape and size; number, location, and contents of the various subroutines; and the location, size, starting and ending points, and step size of the do loops. The equipment variables are often important because each microprocessor, disk or tape drive, monitor, printer, modem, transmission line, . . . has unique operating characteristics such as speed, memory capacity, reliability, . . . , that affect the performance.

The number of control variables can also be very large. A 500-line computer program may, for example, contain 20 do loops. As indicated above, each do loop may have three variables: the starting and ending points, and the step size. In addition, these variables can each be varied at many, not just two, test levels or conditions. Varying only these three variables in all the 20 do loops at 16 levels each would require $16^{60}=1.767 \times 10^{72}$ tests (much over thousands of tests) for the complete factorial experiment. Hence, the problems of combinatorial explosion and computer intractibility are clearly overwhelming. Yet many other variables may be added as shown above. To study only the do-loop variables at 16 levels each, the same fractional factorial design matrix given in the U.S. Pat. No. 4,368,509 patent may again be used but with four or variables assigned to each control variable. This is so because $2^4=16$.

For the self-optimizing machine, the software optimizing task such as software generation, maintenance, or usage, computer simulation, and computer aided design (CAD), engineering (CAE), or training (CAT), . . . is first defined. The optimizing performance in different weighing indices are next given. The number, type, and allowable range of the variables in different categories are then fed. As shown, this fed information may include the number, type, location, operating characteristics, . . . of the different coprocessors or on-site slave microprocessors, monitors, disk or tape drives, telecommunication equipment, modems, printers, . . . ; and the number, type, and characteristics of the different subroutines, do loops, or numerical analytical methods; . . . It is then up to the master processor in the self-optimizing machine to continuously and automatically plan (CAP) or automatically and instantly plan (AIP), to direct the various optimizing steps such as CAE, CAT, CAO, and CAC, and to repeat the self-optimizing or automatic R&D cycles as needed.

The effect of using a particular equipment, procedure, or software part is then determined, and the main and interaction effects of the variables are computed. One or more of the optimizing schemes described above are followed. The optimal combination of the variables is determined and set, redetermined and reset, so that the software generation, modification, application, . . . tasks are optimized statically, or continuously in dynamic situations. In these software-related tasks, no physical products are manufactured or serviced, yet the results are just as rewarding. These results may be self-optimized CAD, CAE, computer integrated instruction (or training), simulation, battle management, signal or image processing, sensor data fusion, communication, reconnaissance, surveillance, command and control, weapon delivery, automatic defense, geopolitical assessments, financial data analyses, and stock, option, and commodity trading strategy generation and execution.

There is a new technology called "artificial life" being developed to create softwares whose behavior mimics that of living creations.

The newly produced computer programs can actually evolve into more powerful programs through their own interaction and merging to create a new generation—a Darwinian process similar to that of biological organisms. Such evolution could produce software more reliable than those designed by human programmers, who cannot anticipate all the potential ways in which their softwares can fail. Again, the $16^{60}$ tests to search or design an optimized (not just improved) 500-line instruction program containing 20 do loops cannot be handled without the continuous automatic planning (CAP) of fractional factorial experiments. The saving in simulation or search tests is not just 10, 100, 1,000, or 10,000 times, but $10^{69}$ times. Yet a modern financial, industrial, or military computer program may contain over 5-million or 10-million instructions.

The self-optimizing methods when applied to rapid or instant knowledge acquisition, prototype modeling, and software development, management, improvement, usage, reuse, or error, defect, and virus detection and elimination, will not merely improve after numerous time-consuming searching, learning, or adapting trials and errors, but directly and certainly optimize in real time, the performance on cost, productivity, accuracy, reliability, availability, and maintainability. Real-time software design, development, testing, implementation, and maintenance is therefore possible. The resultant self-optimizing systems will also identify performance problems before they arise, optimally determine or reallocate current resources, and decide on future capacity requirements. In many situations, this new method will quickly process information and perform decision aid tasks.

According to the method of the invention given above, I have developed a real-time self-optimizing heating system or machine. This machine has a 64-K, Apple II Plus microcomputer, a Lindberg Type 54032 or 55035 furnace, a Chromel-Alumel thermocouple sensor, and a 25-ampere Omega solid-state relay as the actuator. A 3¾-bit A to D converter, a special parallel interface board, and some transmission lines complete the hardware.

This machine does not work on a fixed, control program based on preconceived heating dynamics model, and predetermined control constants and setpoints, as is usually the case. Rather, its Apple microcomputer plans its own designed test matrix according to the technique described above; directs the relay actuator to be on and off at planned temperatures for specified lengths of times according to the design test matrix; collects and analyses the sensed temperature data to determine, with or without the use of the steepest ascent method, the instantaneous, unique combination of the variables which optimizes the machine performance, e.g., minimum temperature fluctuations, absolute temperature deviations from the set temperature, time to reach set temperature, . . . ; and sets the machine accordingly.

Even with the large thermal inertia, within minutes of turning on the machine is heated to and controlled within typically a fraction of a degree Centigrade from the set temperature of, e.g., 527° C. The sensitivity on this machine is limited by the A to D converter. Some other real-time self-optimizing machine have also been developed and successfully tested.

In addition, the U.S. Pat. No. 4,368,509 patent also points out the various relevant prior arts including Hardaway's extreme parameter search control system (U.S. Pat. No. 3,446,430), Russo's combined pattern recognition and linear regression network (U.S. Pat. No. 3,576,976), Smith's digital process control (U.S. Pat. No. 3,694,636), and Barron's control system (U.S. Pat. Nos. 3,460,096 and 3,519,998) which provide background for the design and use of control systems, system programming, actuators, calculators, timing circuits, A/D or D/A converters, storage memories, sensors, comparators, logic devices, sign detectors, . . . which are often useful in the practice of my invention. I hereby incorporate the essential materials of these patents into this application by reference.

The invention, as described above, is not to be construed as limited to the particular forms disclosed herein, since these are to be regarded as illustrative rather than restrictive. Various combinations, equivalent substitutions, or their modifications of the preferred embodiments described herein are obviously possible in light of the description, without departing from the spirit of the invention. Accordingly, the invention is to be limited only as indicated by the scope of the appended claims.

I claim:

1. An article of manufacture comprising:
  a computer usable medium having computer readable program code means embodied therein for self-optimizing or self-improving a performance of a computer optimizable object having a plurality of selected control variables, the computer readable program code means in said article of manufacture comprising:
    computer readable program code means for performing a plurality of computerized automatic experimental cycles on said computer optimizable object relative to said plurality of selected control variables, said computer readable program code means performing the steps of:
      computer-planning a designed experiment for each of the plurality of the computerized automatic experimental cycles; said computer-planning step comprising computer-planning at least one new computer designed experiment in a new experimental region not centered around a point representing an optimum variable combination in an immediately previous experimental cycle;
      computer-executing each experimental cycle according to the respective designed experiment to obtain test results;
      computer-analyzing, in real time, the test results to determine a way to combine optimally the selected control variables for optimizing or improving the performance of the computer optimizable object; and
      computer-coding the computer usable data structure for storage in a selected computer readable data storage means; and
      computer-storing the computer coded and computer analyzed data structure in the selected computer readable data storage means.

2. An article of manufacture according to claim 1 wherein prior to said computerized automatic experimental cycles, said performance is selected by a human or machine automation manager; and
  after at least one of said computerized automatic experimental cycles said human or machine automation manager decides on whether or which two-variable interaction is to be further analyzed.

3. An article of manufacture according to claim 2 wherein said computer-planning step further comprises computer-planning said computer-designed experiment to treat a minimum number of control variables selected from a group consisting of 15, 31, 63, 127, 255, 511, and 1023.

4. An article of manufacture according to claim 2 wherein said computer-planning step further comprises computer-planning the designed experiment for separating the main effect of the control variables from selected combined interaction effects of multiple variables.

5. An article of manufacture according to claim 2 wherein said performance relates to a computer self-optimizable physical or mental growth activity of a living object selected from the group consisting of human, animal, bacteria, virus, germ, and plant.

6. An article of manufacture as in claim 1 wherein said computer-planning step comprises computer-planning for the at least one experimental cycle after the first cycle, a new computer-designed experiment to estimate at least one expected two-variable interaction effect in addition to main effects of at least two designated control variables;
  a main effect being a computer-analyzed individual effect of a single control variable on the performance of the object, while a two-variable interaction effect being a computer-analyzed combined effect of two selected control variables on the performance.

7. A computer program product for use in self-optimizing or self-improving a performance of a computer optimizable object having a plurality of selected control variables, said computer program product comprising:

a computer usable medium having computer readable program code means embodied in said medium for performing a plurality of computerized automatic experimental cycles on said plurality of selected control variables, said computer program product having:

computer readable program code means for causing a computer to self-plan a designed experiment for each of the plurality of the computerized automatic experimental cycles; said computer self-planning step comprising: computer-planning, after the first computerized automatic experimental cycle, at least one new computer-designed experiment for an immediately following experimental cycle;

computer readable program code means for causing a computer to execute the experimental cycles according to the respective computer-planned designed experiments to obtain test results;

computer readable program code means for causing a computer to computer-analyze, in real time, the test results, to find a way to combine optimally the selected control variables for optimizing or improving the performance of the object;

computer readable program code means for causing the computer to computer-transform the computer-analyzed test results into a computer-usable data structure;

computer-readable program code means for causing the computer to computer-code the computer-usable data structure for storage; and computer readable program code means for causing the computer to computer-store the computer-analyzed, computer-transformed, and computer-coded data structure in a selected computer readable data storage device.

8. A computer program product according to claim 7 wherein said object is a computer self-optimizable or self-improvable object;

a performance of said object being selected by a human or machine automation manager for computer self-optimization or self-improvement to accomplish a selected task in practical optimization technology for a specific industry.

9. A computer program product according to claim 7 wherein said computer program product further comprises computer readable program code means embodied in said medium for computer-transforming said computer-analyzed test results into a computer-usable data structure.

10. A computer program product as in claim 7 wherein said self-planning computer readable program code means comprises means for computer-planning, for at least one of the experimental cycles after the first cycle, a new computer-designed experiment in a new experimental region having a center different from that in a previous experimental region, to estimate at least one, likely important two-variable interaction effect in addition to main effects of these two selected control variables to thereby generate an interaction-specific knowledge base in a specific domain of technology;

a main effect being a computer-analyzed individual effect of a single control variable on the performance of the object, while a two-variable interaction effect being a computer-analyzed combined effect of two selected control variables on the performance.

11. A program storage device readable by a machine, tangibly embodying a program of instructions executable by the machine to perform method steps for a plurality of automatic computerized experimental cycles according to a test matrix each involving a plurality of selected control variables capable of use thereby self-optimizing or self-improving a performance of a computer optimizable object having a plurality of selected control variables, said method steps comprising:

computer-planning a designed experiment for each one of the plurality of automatic computerized experimental cycles; the computer designed test matrix in one experimental cycle being different from that of at least another experimental cycle, computer-executing each experimental cycle according to the respective computer-planned designed experiment to obtain test results;

computer-analyzing, in real time, the test results for the experimental cycle to determine a way to combine optimally said plurality of selected control variables for optimizing or improving the performance of the object;

computer-transforming the computer-analyzed test results into a specific computer-transformed data structure; and computer-coding the specific computer-transformed data structure for storage in a selected computer readable data storage means.

12. A program storage device according to claim 11 wherein said method steps further comprise separating or purifying at least one main effect of said plurality of selected control variables from a selected combined interaction effect of multiple variables.

13. A program storage device as in claim 11 wherein said method steps comprise:

computer planning, for at least one of said experimental cycles after the first cycle, a new computer-designed experiment to estimate at least one expected two-variable interaction effect in addition to main effects of at least two designated control variables;

a main effect being a computer-analyzed individual effect of a single control variable on the performance of the object, while a two-variable interaction effect being a computer-analyzed combined effect of two selected control variables on the performance.

14. A memory for storing data for access by an applied optimization program used in a specific industry and being executed on a data processing system for optimizing a computer optimizable object, comprising:

a data structure stored in said memory, said data structure including information on a plurality of selected control variables resident in a knowledge base used by said application program;

said knowledge base being real-time and computer-generated, and containing at least an estimate of an expected two-variable interaction effect in addition to main effects of at least two designated control variables;

a main effect being a computer-analyzed individual effect of a single control variable on the performance of the object, while a two-variable interaction effect being a computer-analyzed combined effect of two selected control variables on the performance.

15. A memory for storing data for access by an applied optimization program used in a specific industry and being executed on a data processing system for optimizing a computer optimizable object, comprising:

a data structure stored in said memory, said data structure including information on a plurality of selected control variables resident in a knowledge base used by said application program;

said knowledge base comprising a real-time and computer-generated, interaction-variable-specific knowledge base.

16. A machine having a memory device which contains the knowledge base computer-generated by the method of claim 15, 17, 19, 23, 24, 28, or 30.

17. A data processing system executing an optimization application program and containing a computer-generated knowledge base used by said application program to perform a practical optimization task in a specific industry;

said data processing system comprising:

a computer device for processing said application program; and a memory component for holding said computer-generated knowledge base for access by said application program, said knowledge base being composed of information resident in said knowledge base used by said application program and including:

determining a presence or absence of a suspected two-variable interaction effect in addition to main effects of at least two designated control variables;

a main effect being a computer-analyzed individual effect of a single control variable on the performance of a computer optimizable object, while a two-variable interaction effect being a computer-analyzed combined effect of two selected control variables on the performance.

18. A computer-readable medium containing instructions for self-optimizing or self-improving a performance of a computer self-improvable object relative to a plurality of control variables by:

computer-planning a plurality of computerized automatic experimental cycles each containing a computer-designed test matrix;

computer-executing the experimental cycles according to the respective computer designed test matrices to collect test results;

computer-analyzing, in real time, the test results to determine a way to combine optimally the selected control variables for computer optimizing or improving the performance of the computer self-improvable object;

computer-coding the computer-analyzed test results for storing a selected computer readable program code means; and when it is determined that the performance of said computer self-improvable object is substantially optimized or improved, recording the optimal combination of the control variables and keeping said computer self-improvable object in the thus-optimized or improved condition.

19. A computer-readable data transmission medium containing a real-time computer-generated knowledge base for optimizing a computer optimizable object and generated by automatic computerized experimentation and optimization in at least two different experimental regions;

said real-time computer-generated knowledge base including an optimal combination of selected control variables in a specific field of technology.

20. A computer-readable data transmission medium according to claim 19 wherein said real-time computer-generated knowledge base is an interaction-specific knowledge base giving an optimized or improved effect on a physical, mental, medical, psychological, or physiological condition or activity of a living computer optimizable object.

21. A computer-readable data transmission medium according to claim 19 wherein said real-time computer-generated knowledge base comprises an instantly machine-generated, interaction-variable identification knowledge base.

22. A computer-readable data transmission medium according to claim 19 wherein said real-time computer-generated knowledge base comprises an interaction-variable identification knowledge base to keep all the main effects and at least one selected two-variable interaction substantially pure.

23. A method in a computer system for communicating with an automation system, the method comprising:

real-time automatic computerized experimenting in at least two different experimental regions on a plurality of selected control variables in at least one computer-designed experiment;

collecting the test results;

computer-analyzing the test results to generate a new knowledge base including at least an optimal combination of the control variables;

computer-coding in real time the new knowledge base into a machine-usable form; and in response to the automation system, telecommunicating, in real time, the computer-coded, new knowledge base to the automation system for its immediate implementation to achieve, instantly and without additional automatic computerized experimentation, a substantially optimal condition thereon.

24. A computer-readable data transmission medium containing a knowledge base, comprising:

real-time computer-generated knowledge base including an optimal combination of selected control variables in a specific field of technology for optimizing a computer optimizable object;

said knowledge base having at least one estimate of an expected two-variable interaction effect in addition to main effects of two designated control variables;

a main effect being a computer-analyzed individual effect of a single control variable on the performance of the computer optimizable object, while a two-variable interaction effect being a computer-analyzed combined effect of two selected control variables on the performance.

25. A computer-readable data transmission medium according to claim 24 wherein said knowledge base is computer-generated using an interaction-variable identification knowledge base for finding at least two of the following: a) the most important variables; b) their main effects; c) if interaction effects exist, at least one important two-variable interaction effect; d) the best way to isolate the control variables from the interaction effects between variables to insure minimum cross-contamination of the main effects and interaction effect.

26. A computer-readable data transmission medium according to claim 24 wherein said knowledge base is computer-generated by running a computer-designed experiment not around a previous optimum variable combination, but at a tolerable distance away from this optimum variable combination, to search for a better global optimum rather than a local optimum, the tolerable distance being such that it is still within the production specification.

27. A computer-readable data transmission medium according to claim 24 wherein said computer-generated knowledge base has at least two of the following features: inexpensive, relevant, timely, unbiased, and reliable.

28. A memory for storing a knowledge base for access by an application program being executed on a data processing system for optimizing a computer optimizable object, comprising:
a knowledge base real-time computer-generated based on automatic computerized testing in at least two different experimental regions and stored in said memory, and including a computer-coded, new database for direct and immediate use by said application program.

29. A method for generating a knowledge base for access by an application program executable by a data processor, said method comprising the method steps, executed by said data processor, of:
a) computer-planning a designed experiment for each of a plurality of computerized automatic experimental cycles on a plurality of selected control variables; said designed experiment being computer-planned to include at least 7 or 15 control variables with no more than one-sixteenth of a number of experimental tests normally required for a complete factorial experimentation, for determining presence or absence of at least one interaction effect of two selected control variables;
said computer-planning step comprising using an interaction-variable identification knowledge base to cause the computer to automatically design the new design matrices specifically to isolate a most important main effect from at least one two-variable interaction effect;
b) computer-executing the experimental cycles according to the respective computer-planned designed experiments to obtain test results;
c) computer-analyzing, in real time, the test results to determine at least a way to combine the selected control variables for optimizing a performance of a computer optimizable object;
said computer-analyzing step additionally determining presence or absence of at least one suspected two-variable interaction effect in addition to substantially pure main effects of at least two designated control variables, a main effect being a computer-analyzed individual effect of a single control variable on the performance of the computer optimizable object, and a two-variable interaction effect being a computer-analyzed combined effects of two selected control variables on the performance of the object; and
d) computer-coding an interaction-specific knowledge base generated by said computer-analyzing step for storage in a selected computer readable program memory means.

30. A method for self-optimizing or self-improving a performance of a computer optimizable object for use by an application program being executable by a data processor, said method comprising the method steps, executed by said data processor, of:
a) planning with a computer a designed experiment for each of a plurality of computerized automatic experimental cycles on a plurality of selected control variables;
b) sequentially computer-executing the experimental cycles according to the respective computer-planned designed experiments to obtain test results;
c) computer-analyzing, in real time, the test results to computer-generate an interaction-specific knowledge base relating to presence or absence of at least one combined effect of at least two selected control variables and also to a way for optimizing or improving the performance of said object;
d) computer-coding the computer-generated interaction specific knowledge for storage in a selected computer memory device; and
e) computer-telecommunicating, in real time, said computer-generated interaction specific knowledge base to a computing means for use not in starting its own new computerized automation experimentation, but as an embedded expert system that performs at least a plurality of the following:
aa) understands the computer-generated and computer-coded knowledge base;
bb) logically compares different parts of the knowledge base;
cc) selects relevant compared parts of the knowledge base;
dd) synthesizes new method steps, based on logical decisions, for further improving the performance of the computer optimizable object; and
ee) provides or prescribes a new synthesized recipe for achieving an improved performance of the computer optimizable object with the use of said computing means.

31. A method according to claim 30 wherein said computer-generated interaction specific knowledge base is substantially instantly machine generated.

32. In a data processing system executing a self-optimization application program and containing a computer generated knowledge base used by said application program to perform, in a plurality of computerized automatic experimental cycles on a computer self-optimizable object, a practical self-optimization task in a specific industry; said data processing comprising: a computer device for processing said application program; and a memory component for holding said computer generated knowledge base for access by said application program, said knowledge base being comprised of information resident in said knowledge base used by said application program, a method of computer self-optimizing said object comprising the steps of:
computer-planning a designed experiment for each of the plurality of the computerized automatic experimental cycles;
at least one of the new designed experiments in one computerized automatic experimental cycle differing from another designed in another computerized automatic experimental cycle in a feature selected from the group consisting of: a) a center of the experimental region; b) a sequence of the selected controlled variables in a design test matrices;
computer-executing each experimental cycle according to the respective designed experiment to obtain test results;
computer-analyzing, in real time, the test results to determine a way to combine optimally the selected control variables for optimizing the performance of the computer optimizable object; and
computer-coding the computer usable data structure for storage in a selected computer readable data storage means.

33. A machine for self-optimizing or self-improving a performance of a computer optimizable object having a plurality of selected control variables comprising:

computer means for performing at least one computerized automatic experiment on said plurality of selected control variables to computer-generate a knowledge base associated with the performance; and means for performing at least a plurality of the following tasks:
- a) self-learning, self-improving, and self-optimizing;
- b) understanding, by a computer, the computer-generated knowledge base associated with the performance of the object;
- c) logically and by a computer, comparing different parts of the knowledge base;
- d) computer-selecting relevant different parts of the knowledge base;
- e) computer-synthesizing at least one new method step based on a logical decision associated with at least a part of the knowledge base;
- f) providing or prescribing a new computer-synthesized recipe for achieving an improved performance on the computer optimizable object with the use of a processor; and
- g) telecommunicating to a computer device a computer synthesized recipe or computer-generated knowledge base to achieve instantly an improved performance without additional computerized automatic experimentation on the object.

34. The machine of claim 33 in which the computer-generated knowledge base has at least a plurality of the following features:

- a) generated by the self-optimizing or self-improving machine experimenting in real-time on the very computer optimizable object whose performance is to be improved;
- b) either interaction specific or interaction non-specific; and
- c) immediately implementable on a computer device to achieve instant improved performance on the object.

* * * * *